United States Patent
Ooi

(10) Patent No.: US 8,849,113 B2
(45) Date of Patent: Sep. 30, 2014

(54) WAVELENGTH SELECTIVE SWITCH AND OPTICAL TRANSMISSION APPARATUS

(75) Inventor: Hiroki Ooi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 271 days.

(21) Appl. No.: 13/409,813

(22) Filed: Mar. 1, 2012

(65) Prior Publication Data
US 2012/0237219 A1    Sep. 20, 2012

(30) Foreign Application Priority Data

Mar. 17, 2011    (JP) .................................. 2011-059619

(51) Int. Cl.
*H04J 14/00* (2006.01)
*H04J 14/02* (2006.01)
*H04Q 11/00* (2006.01)

(52) U.S. Cl.
CPC ........ *H04Q 11/0005* (2013.01); *H04J 14/0212* (2013.01); *H04Q 2011/0016* (2013.01); *H04J 14/0204* (2013.01); *H04J 14/026* (2013.01); *H04J 14/0209* (2013.01); *H04Q 2011/0075* (2013.01)
USPC ................... 398/48; 398/45; 398/49; 398/83; 398/159; 385/24; 385/16; 385/17; 385/18

(58) Field of Classification Search
USPC ........... 398/83, 79, 82, 84, 85, 48, 49, 50, 51, 398/54, 45, 59, 158, 159; 385/24, 37, 16, 385/17, 18
See application file for complete search history.

(56) References Cited

U.S. PATENT DOCUMENTS

| | | | |
|---|---|---|---|
| 7,983,560 B2 * | 7/2011 | Maki et al. ...................... | 398/50 |
| 8,111,995 B2 * | 2/2012 | Wisseman ...................... | 398/83 |
| 8,280,257 B2 * | 10/2012 | Yang et al. ...................... | 398/83 |
| 2009/0220242 A1 | 9/2009 | Ooi et al. | |
| 2010/0028003 A1 | 2/2010 | Nakamura | |
| 2011/0038636 A1 | 2/2011 | Akiyama et al. | |
| 2011/0268445 A1 | 11/2011 | Sakurai | |

FOREIGN PATENT DOCUMENTS

| | | |
|---|---|---|
| JP | 2006-087062 | 3/2006 |
| JP | 2009-180836 | 8/2009 |
| JP | 2009-212584 | 9/2009 |
| JP | 2010-035089 | 2/2010 |
| JP | 2011-232695 | 11/2011 |

OTHER PUBLICATIONS

JPOA—Office Action issued for Japanese Patent Application No. 2011-059619, dated Jul. 22, 2014 Translation of relevant part: p. 1 line 23 to p. 2 line 20 and p. 2 line 30 to p. 3 line 26

* cited by examiner

*Primary Examiner* — Hanh Phan
(74) *Attorney, Agent, or Firm* — Fujitsu Patent Center

(57) ABSTRACT

A wavelength selective switch includes a wavelength dispersing element, a wavelength converging element, multiple transmission control elements, and a controller. The wavelength dispersing element performs wavelength dispersion of input signal light. The transmission control element divides input signal light into wavelength bands within a channel band and transmits or cuts off the divided input signal light. The wavelength converging element converges signal light having respective wavelengths produced from the transmission control elements for output. The controller controls a transmittance of the transmission control element of at least one of the low and high frequency sides in a channel band. The wavelength selective switch sets as a cutoff band at least one of predetermined bands on the low and high frequency sides, narrows a transmission band of the input signal light to be wavelength-multiplexed, deletes an overlapped band of optical spectra, and outputs the transmission signal light, thereby suppressing crosstalk.

5 Claims, 17 Drawing Sheets

WAVELENGTH SELECTIVE SWITCH AND OPTICAL TRANSMISSION APPARATUS

CROSS-REFERENCE TO RELATED APPLICATION

This application is based upon and claims the benefit of priority of the prior Japanese Patent Application No. 2011-059619, filed on Mar. 17, 2011, the entire contents of which are incorporated herein by reference.

FIELD

The embodiment discussed herein is related to a wavelength selective switch which performs wavelength selective switching and an optical transmission apparatus which performs optical transmission.

BACKGROUND

In a node for constructing an optical network, route switching through OADM (Optical Add Drop Multiplexing) is performed, and a WDM (Wavelength Division Multiplexing) transmission in which signal light having multiple wavelengths different from each other is multiplexed is performed.

In the OADM, particularly, an arbitrary wavelength channel is added from and to each port of nodes, and colorless OADM in which an arbitrary wavelength channel is dropped is realized.

As a conventional technology, a technology for expanding the OADM function is proposed upon request. A technology for removing feet of optical spectra is further proposed.
Japanese Laid-open Patent Publication No. 2006-87062
Japanese Laid-open Patent Publication No. 2009-212584

As described above, when a wavelength channel is added or dropped to perform WDM transmission by using the colorless OADM, efficiency of wavelength routing is improved.

However, when wavelength channels having wavelengths different from each other are wavelength-multiplexed, there is a problem that crosstalk between wavelength channels occurs. Particularly, as a transmission data rate is larger, a bandwidth of an optical spectrum is wider. Therefore, an influence of crosstalk between adjacent wavelength channels is more exerted to degrade transmission quality.

SUMMARY

According to one aspect of the present invention, this wavelength selective switch includes a plurality of transmission control elements configured to divide input signal light into wavelength bands within a channel band and transmit or cut off the divided input signal light; and a controller configured to control a transmittance of the transmission control element of at least one of low and high frequency sides in the channel band.

The object and advantages of the invention will be realized and attained by means of the devices and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
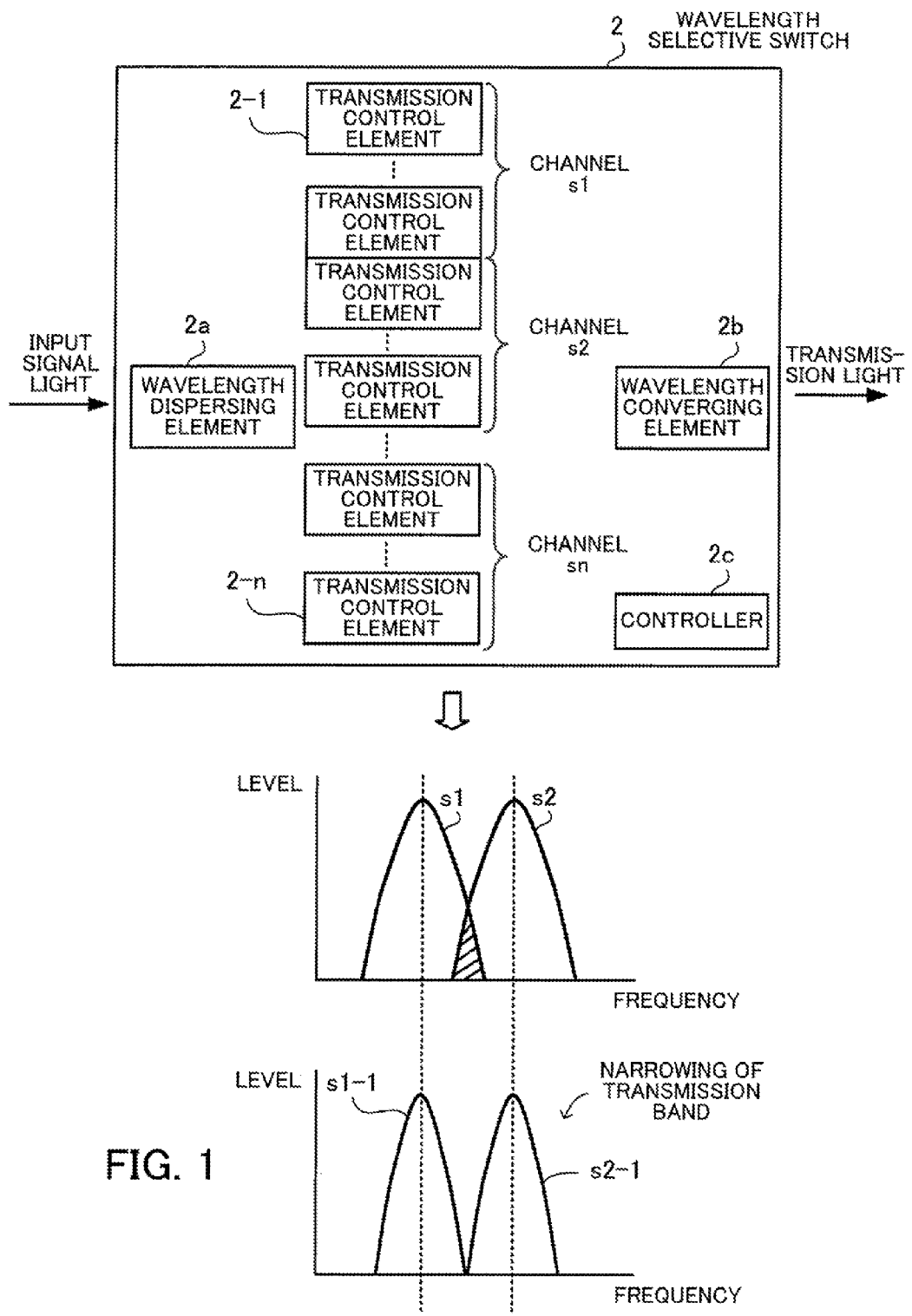
FIG. 1 illustrates a configuration example of a wavelength selective switch.

An embodiment will be described below with reference to the accompanying drawings, wherein like reference numerals refer to like elements throughout. FIG. 1 illustrates a configuration example of a wavelength selective switch. The illustrated WSS (Wavelength Selective Switch) 2 includes a wavelength dispersing element 2a, a wavelength converging element 2b, a plurality of transmission control elements 2-1 to 2-n, and a controller 2c.

The wavelength dispersing element 2a performs wavelength dispersion of input signal light. The transmission control elements 2-1 to 2-n each divide input signal light into wavelength bands within a channel band and transmit or cut off the divided input signal light. The wavelength converging element 2b converges signal light of each wavelength produced from the transmission control elements 2-1 to 2-n for output. The controller 2c controls a transmittance of the transmission control element of at least one of the low and high frequency sides in a channel band.

Here, in the transmission control elements 2-1 to 2-n, the controller 2c controls a transmittance of the transmission control element of at least one of the low and high frequency sides with respect to input signal light of multiple wavelengths different from each other. The controller 2c further sets as a cutoff band a predetermined band of at least one of the low and high frequency sides, and narrows a transmission band of the input signal light to be wavelength-multiplexed.

With respect to input signal light s1 (hereinafter, referred to as a channel s1) having a wavelength $\lambda 1$, for example, in the transmission control element of the channel s1, the controller 2c controls a transmittance of the transmission control element on the low frequency side and sets a predetermined band on the low frequency side as a cutoff band. On the other hand, the controller 2c controls a transmittance of the transmission control element on the high frequency side and sets a predetermined band on the high frequency side as a cutoff band. The controller 2c subjects the transmission control elements to the above-described control and narrows a transmission band, thereby generating transmission signal light s1-1.

With respect to input signal light s2 (hereinafter, referred to as a channel s2) having a wavelength $\lambda 2$ ($\lambda 1 \neq \lambda 2$), the controller 2c further controls a transmittance of the transmission control element on the low frequency side and sets a predetermined band on the low frequency side as a cutoff band. On the other hand, the controller 2c controls a transmittance of the transmission control element on the high frequency side and sets a predetermined band on the high frequency side as a cutoff band. The controller 2c subjects the transmission control elements to the above-described control and narrows a transmission band, thereby generating transmission signal light s2-1.

As can be seen from the above sequence, a band portion (shaded area illustrated in FIG. 1) in which optical spectra of the input signal light s1 and s2 are overlapped is deleted and the transmission signal light s1-1 and s2-1 are output. Therefore, the processing permits optical crosstalk to be suppressed and characteristic degradation to be reduced.

FIG. 1 illustrates a state in which the entire overlapped portion of the optical spectra is deleted. However, when the optical crosstalk satisfies desired transmission quality in a permissible range, the entire overlapped portion need not be deleted.

As the above-described WSS 2, for example, the present embodiment may use an LCOS (Liquid Crystal On Silicon) device which is a liquid crystal cell having formed thereon a liquid crystal on a silicon substrate and controls a transmittance (a transmission control element is also referred to as a pixel). Alternatively, as the WSS 2, the present embodiment may use a DLP (Digital Lightwave Processing) device in which a micro mirror is provided on a silicon chip and which controls a transmittance by using a mirror angle.

Figure 2:
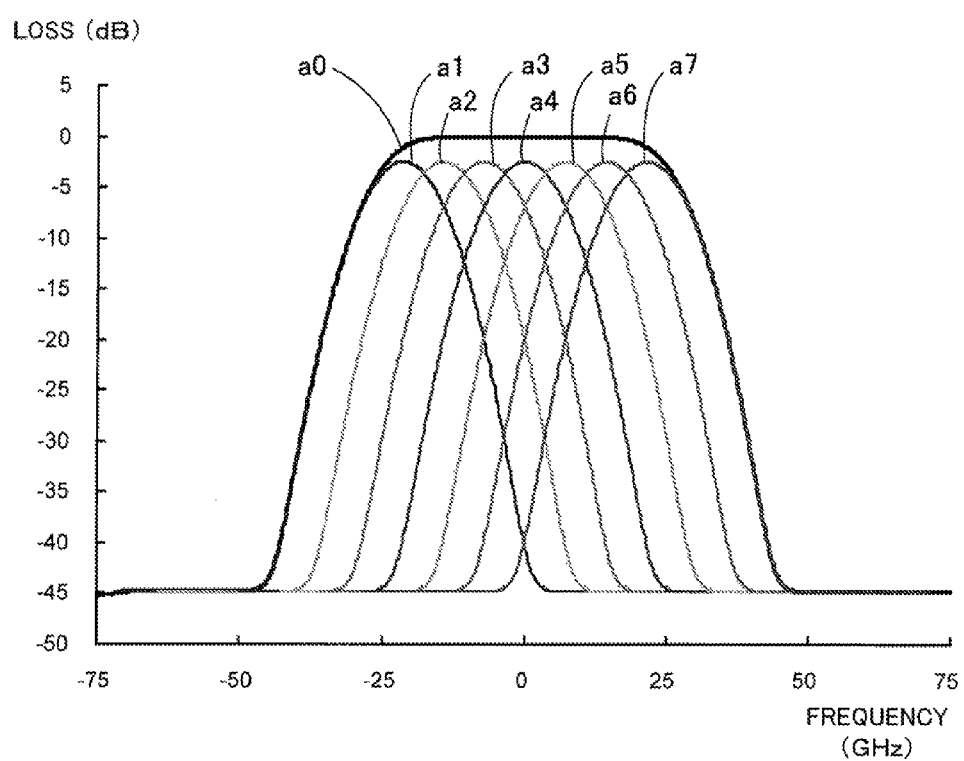
FIG. 2 illustrates narrowing of a transmission band.
Figure 3:
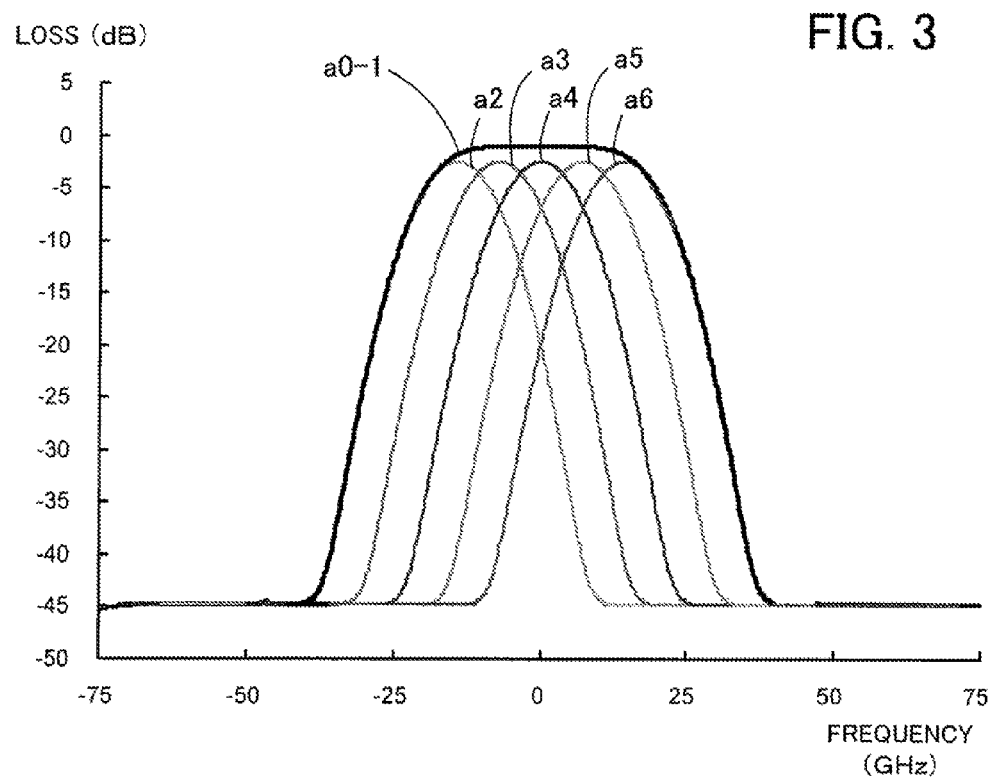
FIG. 3 illustrates narrowing of a transmission band.

Next, narrowing of a transmission band will be described. FIGS. 2 and 3 illustrate the narrowing of a transmission band. The horizontal axis represents a frequency (relative frequency: GHz), and the longitudinal axis represents loss (relative loss: dB).

FIG. 2 illustrates a transmission characteristic at the time of failing to subject signal light (having a wavelength λ0) of one wave to the narrowing. Suppose that a transmission characteristic a0 has a shape as illustrated in FIG. 2 with respect to a signal light spectrum a center frequency of which is 0 GHz (shape of an outmost line). An internal area of the transmission characteristic a0 is rendered into a transmission band (passband).

In the WSS 2, the controller 2c divides one wavelength channel band of the transmission characteristic a0 by using a plurality of the transmission control elements 2-1 to 2-n and controls transmittances of them, respectively. Suppose, for example, that the controller 2c divides one wavelength channel band of the transmission characteristic a0 by using the transmission control elements 2-1 to 2-7 of seven elements and controls transmittances of them, respectively.

Suppose, here, that the transmission control elements 2-1 to 2-7 correspond to the low frequency side to the high frequency side in the order. In this case, when transmitting signal light having the wavelength λ0, the WSS 2 turns on all the transmission control elements 2-1 to 2-7 of seven elements and performs transmission filtering. This processing permits the signal light having the wavelength λ0 to be transmitted.

In the case of FIG. 2, the transmission characteristics a1 to a7 correspond to the transmission control elements 2-1 to 2-7, respectively. When turning on the transmission control element 2-2, the WSS 2 has a function of transparent filtering with a shape of the transmission characteristic a1. In the same manner, when turning on the transmission control element 2-7, the WSS 2 has a function of transparent filtering with a shape of the transmission characteristic a7.

As can be seen from the above sequence, suppose that one wavelength channel having the wavelength λ0 is transmitted according to the transmission characteristic a0. In this case, the WSS 2 turns on all of the transmission control elements 2-1 to 2-7 and generates transmission bands of the transmission characteristics a1 to a7, thereby realizing the transmission characteristic a0.

FIG. 3 illustrates a transmission characteristic after the narrowing. In the case of narrowing a transmission band, for example, the WSS 2 turns off the transmission control element 2-1 which performs light transmission control on the low frequency side of the input signal light and reduces a transmittance of the transmission control element 2-1, thus cutting off a transmission band on the low frequency side. Further, the WSS 2 turns off the transmission control element 2-7 which performs light transmission control on the high frequency side of the input signal light and reduces a transmittance of the transmission control element 2-7, thus cutting off a transmission band on the high frequency side.

By performing the above-described control, the WSS 2 turns on the transmission control elements 2-2 to 2-6 and turns off the transmission control elements 2-1 and 2-7 among the transmission control elements 2-1 to 2-7. As a result, a shape as in the transmission characteristic a0-1 is obtained. Specifically, bandwidths of optical spectra of the transmission characteristic a0 of FIG. 2 are narrowed and the transmission characteristic a0-1 of FIG. 3 is obtained. The narrowing of the optical spectra is thus performed.

As can be seen from the above discussion, when dividing a transmission characteristic in a wavelength channel band by using the plurality of the transmission control elements 2-1 to 2-n for control, the WSS 2 controls transmittances of the transmission control elements of the low and high frequency sides with respect to the input signal light. Then, the WSS 2 is supposed to cut off transmission light of predetermined bands on the low and high frequency sides and narrow transmission bands of the input signal light.

This feature of the WSS 2 makes it possible to transmit input signal light of multiple wavelength channels by narrowing optical spectrum widths. Therefore, since an overlapped portion of optical spectra between the adjacent wavelength channels is eliminated and crosstalk is suppressed, characteristic degradation is reduced.

An example where one transmission control element on the low frequency side and another transmission control element on the high frequency side are turned off to reduce transmittances is described above. The plurality of the transmission control elements may be further turned off with respect to the low and high frequency sides so as to eliminate an overlapped portion of optical spectra according to a transmission data rate.

Further, a control method is not limited to the control that transmittances are uniformly reduced on the low and high frequency sides. The transmittances may be controlled so as to be nonuniformly reduced on the low and high frequency sides. For example, the transmittances may be reduced as much as two elements on the low frequency side, and on the other hand, as much as one element on the high frequency side.

Predetermined bands on both the low and high frequency sides and transmission bands of the input signal light are further set as cutoff bands and narrowed above. However, a predetermined band of the input signal light may be set as a cutoff band and narrowed only on the low frequency side or only on the high frequency side.

Next, before describing a system application example of the WSS 2, a general optical transmission system having a colorless OADM function will be described.

Figure 4:
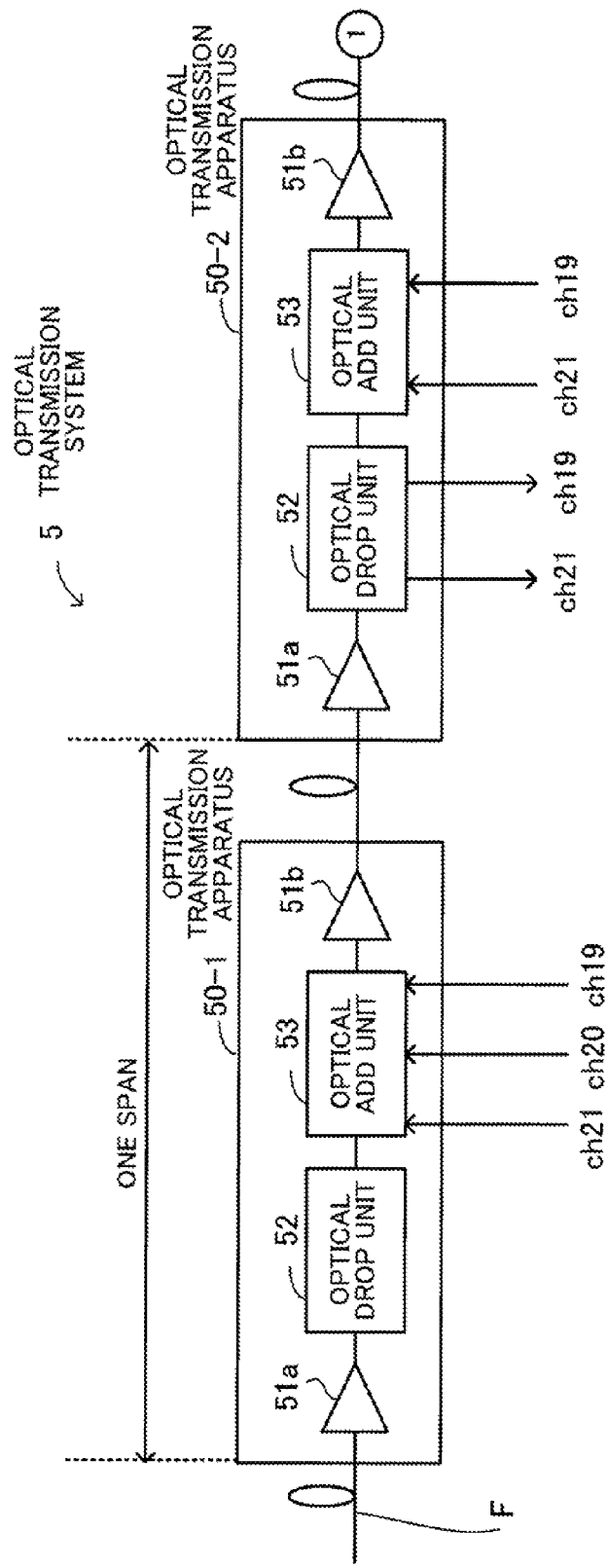
FIG. 4 illustrates a configuration example of an optical transmission system.
Figure 5:
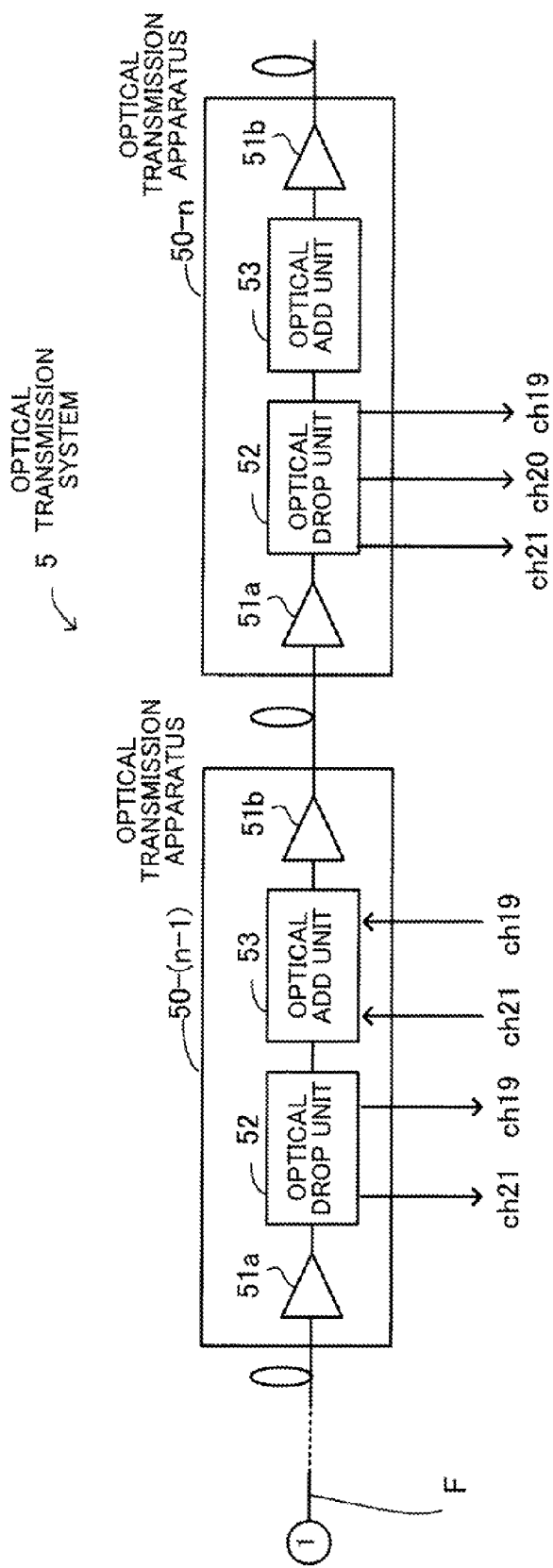
FIG. 5 illustrates a configuration example of an optical transmission system.

FIGS. 4 and 5 illustrate a configuration example of the optical transmission system. The optical transmission system 5 includes optical transmission apparatus 50-1 to 50-n, and they are serially connected through an optical fiber transmission path F. The optical transmission apparatus 50-1 to 50-*n* each include a preamplifier 51*a*, a post amplifier 51*b*, an optical drop unit 52, and an optical add unit 53.

The preamplifier 51*a* amplifies WDM signal light flowing through the optical fiber transmission path F. The optical drop unit 52 receives the amplified WDM signal light and drops it into two portions. One dropped WDM signal light is supplied to a main transmission line (to the optical add unit 53) and the other dropped WDM signal light is dropped to a tributary side.

The optical add unit 53 receives signal light added from the tributary side. The optical add unit 53 then wavelength-multiplexes the WDM signal light transmitted from the optical drop unit 52 and the added signal light, and generates new WDM signal light. For an application device of the optical add unit 53, a device such as an optical coupler and WSS is used and wavelength multiplexing is performed.

The post amplifier 51*b* amplifies the WDM signal light produced from the optical add unit 53 and outputs it to a next stage apparatus through the optical fiber transmission path F.

In the above-described optical transmission system 5, wavelength channels ch19, ch20, and ch21 are added to the optical transmission apparatus 50-1. In the optical transmission apparatus 50-2 to 50-(n−1), the wavelength channels ch19 and ch21 being both sides of the wavelength channel ch20 are repeatedly added and dropped. In the optical transmission apparatus 50-*n*, the wavelength channels ch19, ch20, and ch21 are further dropped. A transmission penalty at the time of constructing the above-described model will be described below.

Figure 6:
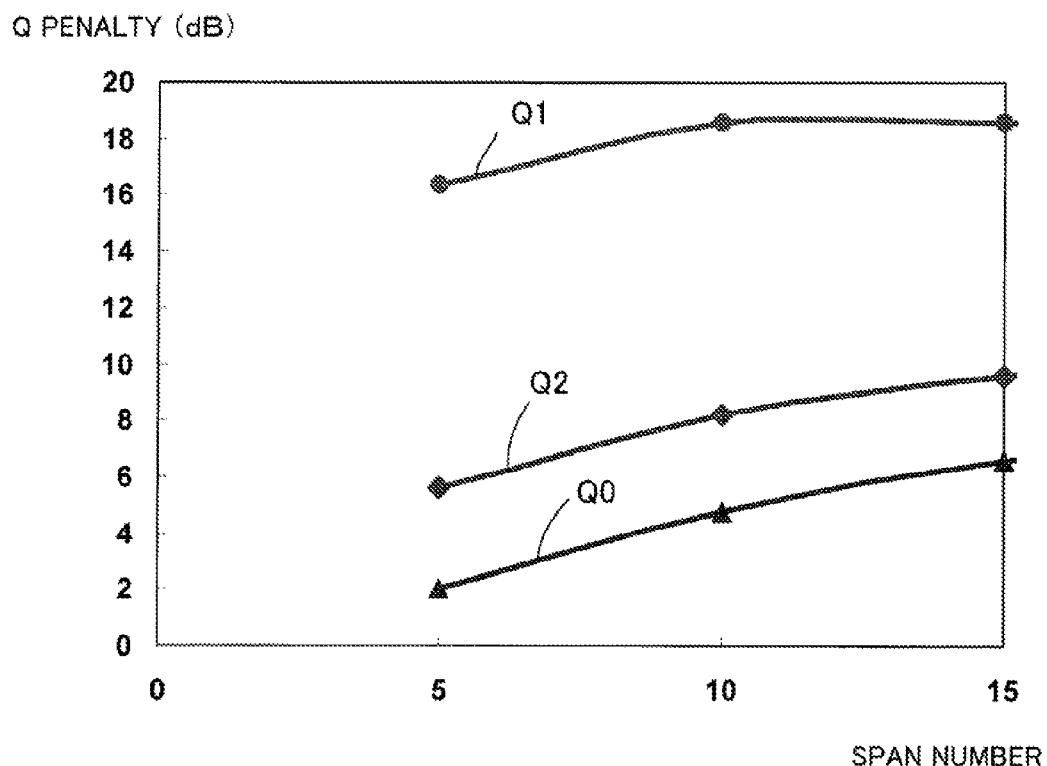
FIG. 6 illustrates a transmission penalty.

FIG. 6 illustrates the transmission penalty. The horizontal axis represents a span number, and the longitudinal axis represents a transmission penalty (Q penalty: dB). As the span number is larger, longer distance transmission is used. Further, as a value of the transmission penalty is larger, the transmission characteristic is more degraded.

A transmission penalty Q1 is a value of the transmission penalty at the time when wavelength multiplexing in the optical add units 53 of the optical transmission apparatus 50-1 to 50-*n* is implemented by using an optical coupler. A transmission penalty Q2 is a value of the transmission penalty at the time when the wavelength multiplexing in the optical add units 53 is implemented by using an LCOS WSS. Further, a transmission penalty Q0 is a value of the transmission penalty of signal light of one wave transmitted through apparatus without performing wavelength multiplexing.

It is seen from the transmission penalties Q0 to Q2 of FIG. 6 that in the case where signal light is wavelength-multiplexed by using an optical coupler or WSS to implement the WDM transmission, transmission quality is largely degraded as compared with the transmission in which the wavelength multiplexing is not performed.

This is mainly caused by the fact that crosstalk occurs between adjacent wavelength channels during the wavelength multiplexing. Since the transmission penalty Q1 is larger than the transmission penalty Q2, in the case where the wavelength multiplexing is performed by using an optical coupler, degradation of the transmission quality is found to be large as compared with a case of using the WSS.

Figure 7:
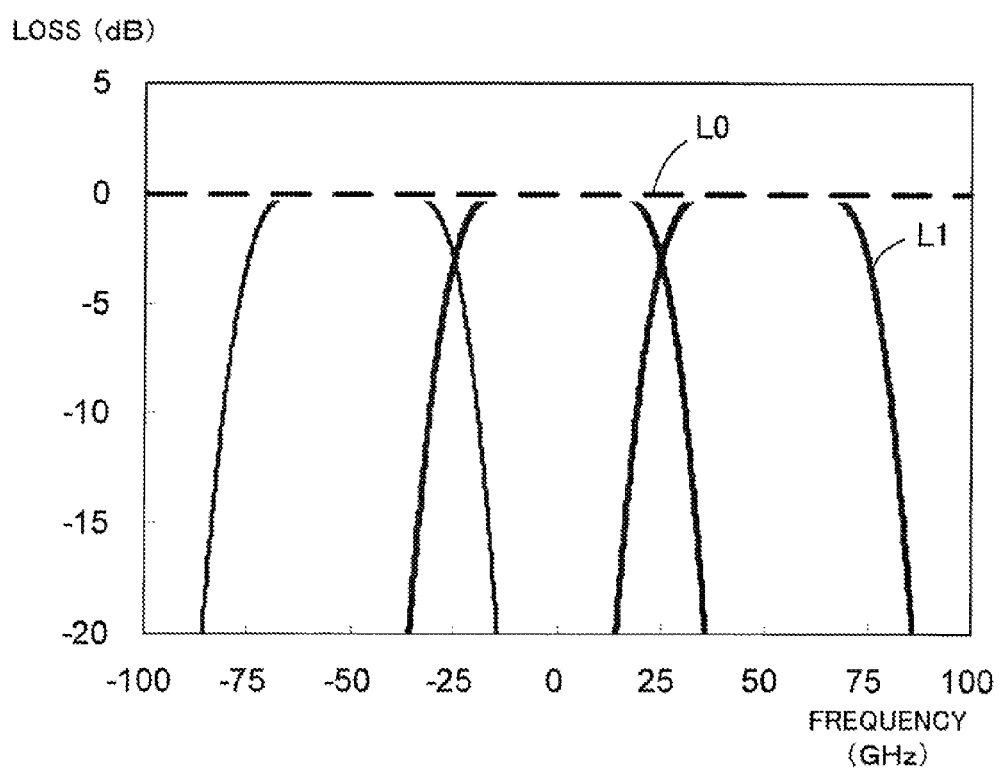
FIG. 7 illustrates loss during wavelength multiplexing.

Optical loss of an optical coupler and a WSS during the wavelength multiplexing will be described below. FIG. 7 illustrates loss during the wavelength multiplexing. The horizontal axis represents the frequency (relative frequency: GHz), and the longitudinal axis represents the loss (relative loss: dB). Loss L0 (dotted line) indicates a loss value of the optical coupler, and loss L1 (solid line) indicates a loss value of the WSS.

The wavelength multiplexing of signal light of multiple wavelength channels is supposed to be performed by using an optical coupler as the optical add unit 53. In this case, since power multiplexing is performed in the optical coupler, a loss level becomes constant also with respect to channels of every frequency (wavelength). In short, since feet of optical spectra of the adjacent wavelength channels are multiplexed without attenuation, degradation due to crosstalk becomes significant.

Suppose, on the other hand, that wavelength multiplexing of signal light of the multiple wavelength channels is performed by using the WSS. In this case, light attenuation at a center wavelength (−25 GHz and +25 GHz of FIG. 7) between the wavelength channels is reduced at 3 to 6 dB and the wavelength-multiplexing is performed.

Therefore, since feet of the optical spectra are slightly attenuated to perform the wavelength multiplexing, a crosstalk characteristic becomes better as compared with a case of using the optical coupler. Note that the wavelength multiplexing is not performed with feet of optical spectra being completely cut off, and an overlapped portion of optical spectra of adjacent wavelength channels becomes large according to a size of the transmission data rate. Therefore, desired transmission quality fails to be anticipated by simply using the WSS.

Figure 8:
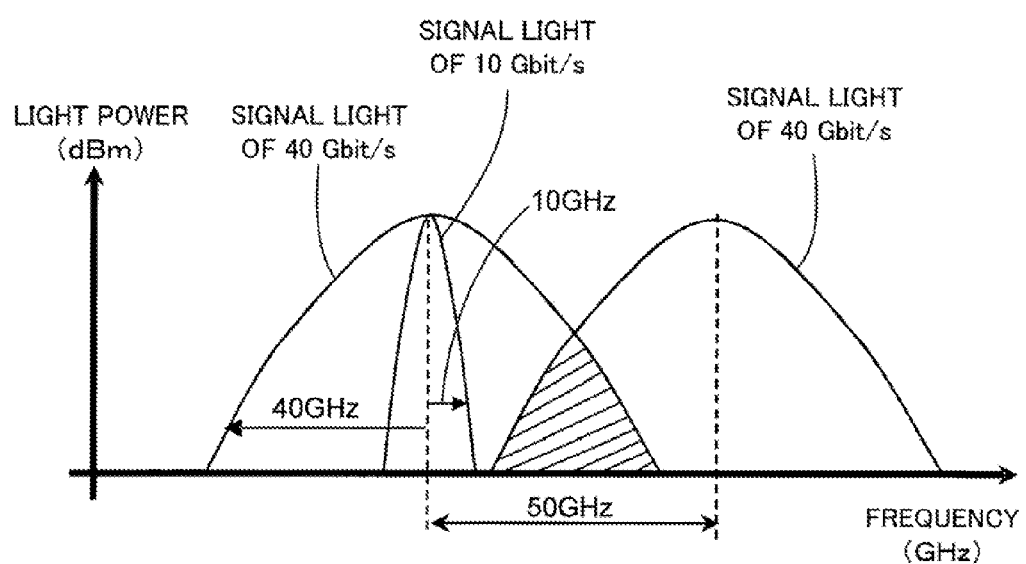
FIG. 8 illustrates an overlapped portion of optical spectra.

Next, the fact that an influence of crosstalk is apparently exerted according to a size of the transmission data rate will be described. FIG. 8 illustrates an overlapped portion of the optical spectra. The horizontal axis represents a frequency (GHz), and the longitudinal axis represents light power (dBm). It is assumed here that the volume of information is increased to transmission of data rates from 10 Gb/s to 40 Gb/s.

In the case of using a data rate of 10 Gb/s, for example, since a light spectrum half value width of one wave is 10 GHz even if performing the wavelength multiplexing in an interval between center frequencies of 50 GHz, feet of optical spectra of the adjacent wavelength channels are not overlapped.

As compared with the above, in the case of using a data rate of 40 Gb/s, since a light spectrum half value width of one wave is 40 GHz when performing the wavelength multiplexing in an interval between center frequencies of 50 GHz, feet of optical spectra of the adjacent wavelength channels are overlapped (shaded area of FIG. 8).

As can be seen from the above discussion, as the transmission data rate is higher, an optical spectrum width of signal light is more widened. Accordingly, when performing the WDM transmission having a high transmission data rate, feet of the optical spectra of the adjacent wavelength channels are overlapped and signal degradation due to crosstalk is significantly exerted.

Figure 9:
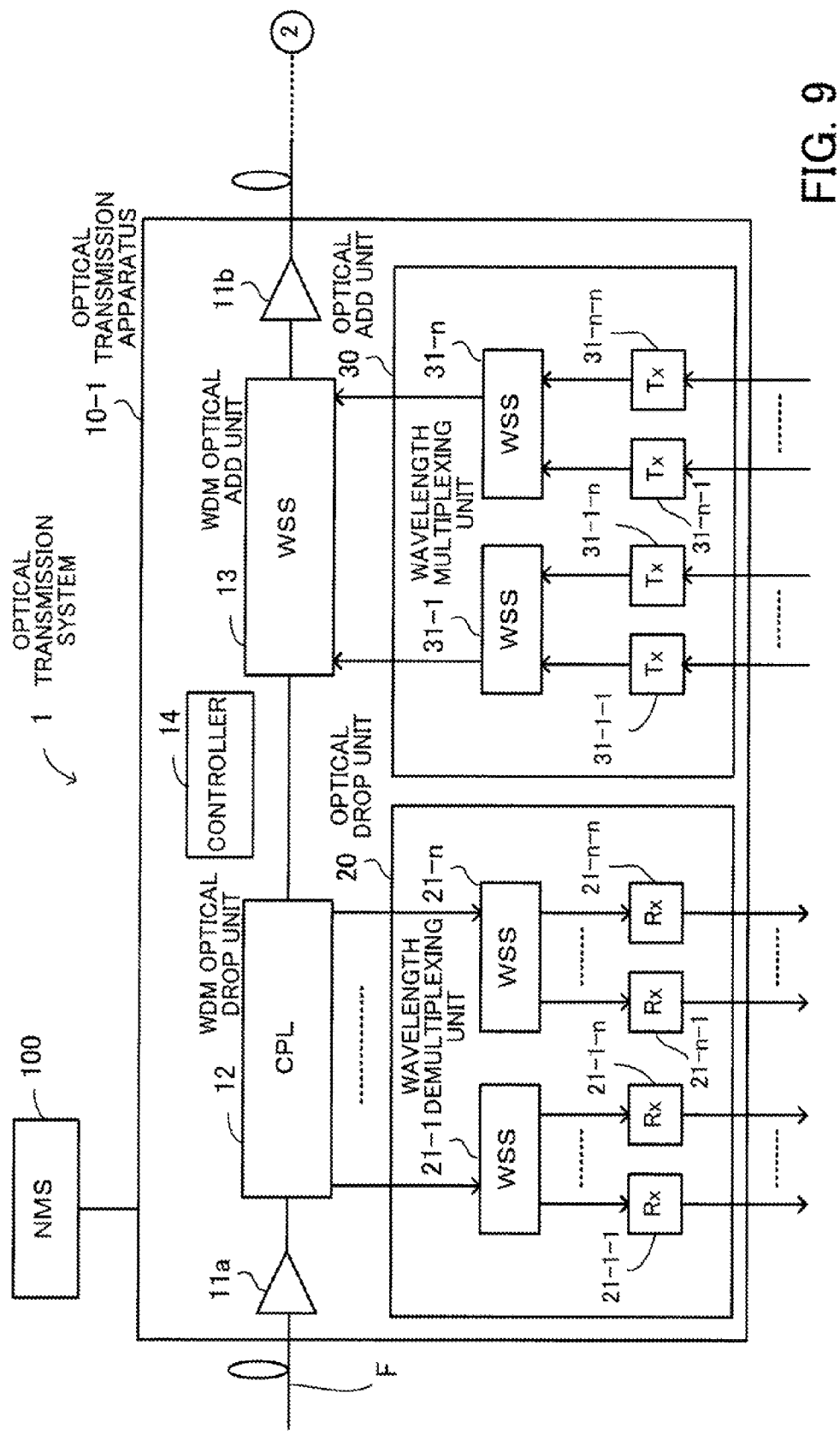
FIG. 9 illustrates a configuration example of an optical transmission system.
Figure 10:
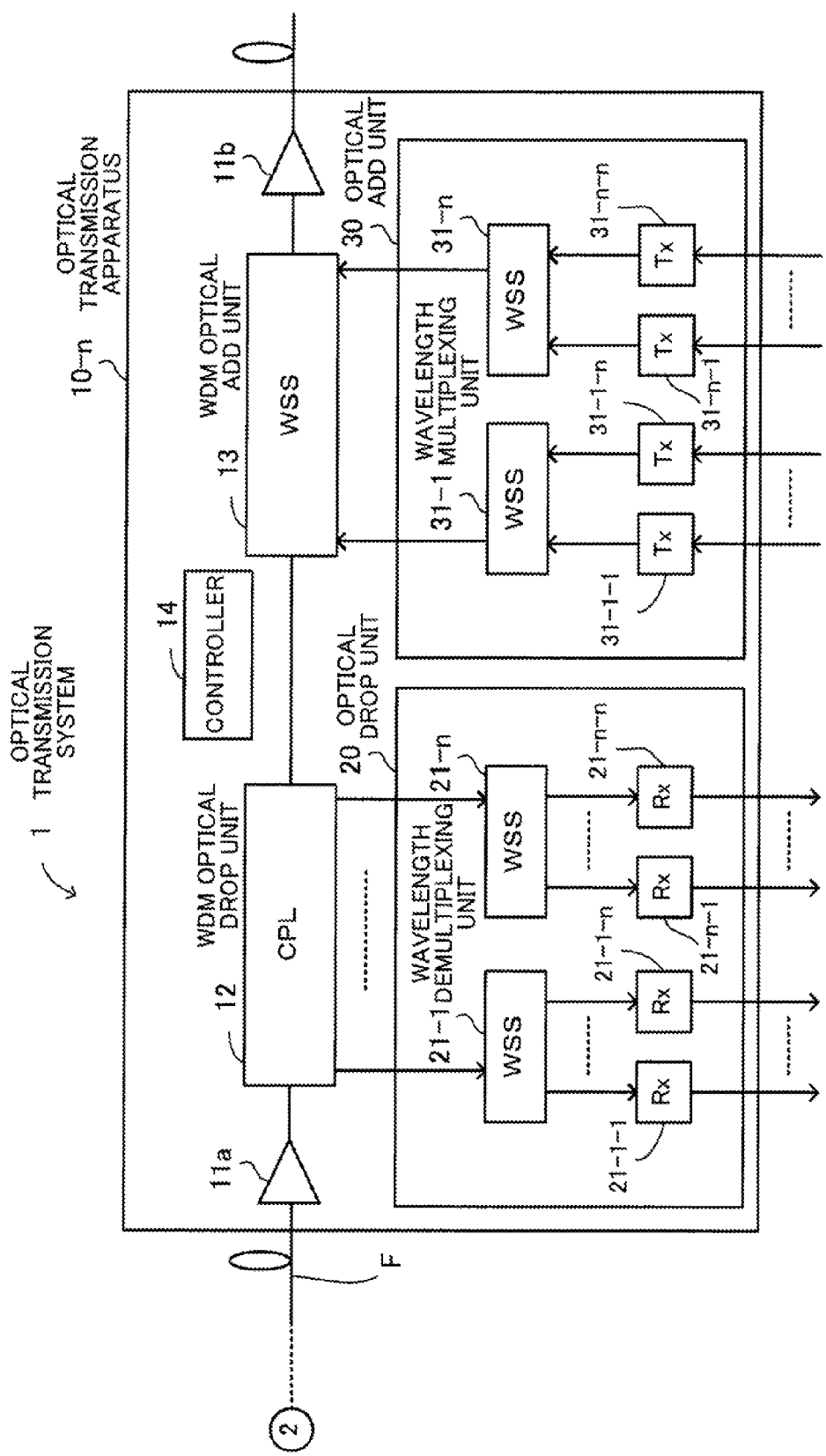
FIG. 10 illustrates a configuration example of an optical transmission system.

Next, an optical transmission apparatus and optical transmission system having applied thereto the WSS 2 which performs narrowing of a transmission band will be described. FIGS. 9 and 10 illustrate a configuration example of the optical transmission system. The optical transmission system 1 includes optical transmission apparatus 10-1 to 10-*n*, and they are serially connected through an optical fiber transmission path F.

An NMS (Network Management System) 100 is further connected to the optical transmission apparatus 10-1. The NMS 100 has a user interface function, and performs operational management of the entire optical transmission system 1 including the optical transmission apparatus 10-1 to 10-*n*.

The optical transmission apparatus 10-1 to 10-*n* each include a preamplifier 11*a*, a post amplifier 11*b*, a WDM optical drop unit 12, a WDM optical add unit 13, a controller 14, an optical drop unit 20, and an optical add unit 30. The WDM optical drop unit 12 and the optical drop unit 20 mainly perform processing relating to drop of the wavelength channels, and the WDM optical add unit 13 and the optical add unit 30 mainly perform processing relating to addition of the wavelength channels.

The optical drop unit 20 includes wavelength demultiplexing units 21-1 to 21-*n* and receiving units 21-1-1 to 21-1-*n*, ..., and 21-*n*-1 to 21-*n*-*n*. To the wavelength demultiplexing unit 21-1, the receiving units 21-1-1 to 21-1-*n* are connected, and the receiving units 21-*n*-1 to 21-*n*-*n* are connected to the wavelength demultiplexing unit 21-*n*.

The optical add unit 30 includes wavelength multiplexing units 31-1 to 31-*n* and transmitting units 31-1-1 to 31-1-*n*, ..., and 31-*n*-1 to 31-*n*-*n*. To the wavelength multiplexing unit 31-1, the transmitting units 31-1-1 to 31-1-*n* are connected, and the transmitting units 31-*n*-1 to 31-*n*-*n* are connected to the wavelength multiplexing unit 31-*n*.

For an application device, an optical coupler is used as the WDM optical drop unit 12, and a WSS is used as the WDM optical add unit 13, the wavelength demultiplexing units 21-1 to 21-*n*, and the wavelength multiplexing units 31-1 to 31-*n*.

The preamplifier 11*a* amplifies WDM signal light flowing through the optical fiber transmission path F. The WDM optical drop unit 12 receives the amplified WDM signal light and drops it into two portions. One dropped WDM signal light is supplied to a main transmission line (to the WDM optical add unit 13) and the other dropped WDM signal light is supplied to the optical drop unit 20.

The wavelength demultiplexing units 21-1 to 21-*n* of the optical drop unit 20 demultiplex the WDM signal light dropped and produced from the WDM optical drop unit into signal light at every wavelength. The receiving units 21-1-1 to 21-1-*n*, ..., and 21-*n*-1 to 21-*n*-*n* receive signal light produced from the wavelength demultiplexing units 21-1 to 21-*n* by wavelength and perform reception processing of signal light of each wavelength, thereby outputting the signal light to the client side.

On the other hand, the transmitting units 31-1-1 to 31-1-*n*, ..., and 31-*n*-1 to 31-*n*-*n* of the optical add unit 30 perform transmission processing of signal light transmitted from the client side. The wavelength multiplexing units 31-1 to 31-*n* wavelength-multiplex signal light of each wavelength transmitted from the transmitting units 31-1-1 to 31-1-*n*, ..., and 31-*n*-1 to 31-*n*-*n*, and transmit the wavelength-multiplexed signal light to the WDM optical add unit 13.

The WDM optical add unit 13 receives the signal light (wavelength-multiplexed signal light) added by the optical add unit 30. The WDM optical add unit 13 then wavelength-multiplexes the WDM signal light transmitted by the WDM optical drop unit 12 and the signal light added by the optical add unit 30, thus generating new WDM signal light.

The post amplifier 11*b* amplifies the WDM signal light produced from the WDM optical add unit 13, and outputs the amplified WDM signal light to the next stage apparatus through the optical fiber transmission path F.

The controller 14 receives setting from the NMS 100 and performs operation setting and supervisory control of its own apparatus. The controller 14 notifies the NMS 100 of an operation status. The controller 14 further communicates with the controllers 14 of the other apparatus.

Communication between the NMS 100 and the controller 14, or communication between the controllers 14 of the apparatus is performed, for example, by using an OSC (Optical Supervisory Channel) signal.

Here, the WSS 2 which performs the narrowing described above in FIG. 1 of the transmission band is used as components in which the wavelength multiplexing of the optical transmission system 1 is performed. Specifically, the WSS 2 (first wavelength selective switch) is used as the wavelength multiplexing units 31-1 to 31-*n* of the optical add unit 30, and the transmission bands of the wavelength channels to be added are narrowed.

In addition to the wavelength multiplexing units 31-1 to 31-*n*, the WSS 2 (second wavelength selective switch) is further used also as the WDM optical add unit 13, thus performing the narrowing of the transmission band.

For example, the NMS 100 notifies the controller 14 of the corresponding optical transmission apparatus of setting of the narrowing control in the transmission band through the WSS 2. The controller 14 receiving the notification then performs setting of the narrowing control to the corresponding WSS 2.

Figure 11:
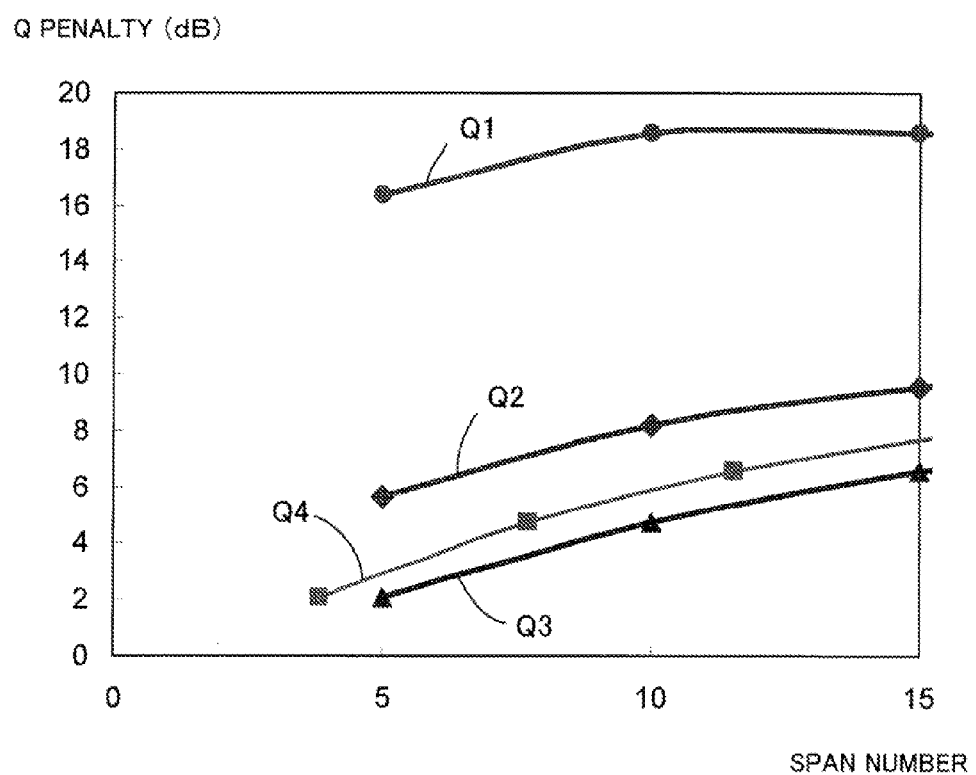
FIG. 11 illustrates a transmission penalty.

Next, the transmission penalty in the optical transmission system 1 will be described. FIG. 11 illustrates the transmission penalty. The horizontal axis represents the span number, and the longitudinal axis represents the transmission penalty (Q penalty: dB).

The transmission penalties Q1 and Q2 have the same values as those illustrated in FIG. 6. The transmission penalty Q1 is supposed to be obtained by implementing the wavelength multiplexing by using an optical coupler in a conventional system. The transmission penalty Q2 is supposed to be obtained by implementing the wavelength multiplexing by using an LCOS WSS.

On the other hand, in the wavelength multiplexing units 31-1 to 31-*n* of the optical transmission system 1, the transmission penalty Q3 indicates values obtained by using the WSS 2 of FIG. 1, performing the narrowing of the transmission band, and performing the wavelength multiplexing.

A transmission penalty Q4 further indicates values obtained by using the WSS 2 of FIG. 1, performing narrowing of the transmission band, and performing the wavelength multiplexing with respect to both of the wavelength multiplexing units 31-1 to 31-*n* and the WDM optical add unit 13 of the optical transmission system 1.

As illustrated in FIG. 11, values of the transmission penalties Q3 and Q4 are sufficiently smaller than those of the transmission penalties Q1 and Q2. Specifically, when the narrowing of the transmission band is performed by using the WSS 2 to perform the wavelength multiplexing, crosstalk is found to be largely reduced as compared with the conventional optical transmission system 5.

In the transmission penalty Q3, the narrowing is performed only in a first wavelength multiplexing processing block in which signal light is added to the other signal light and the narrowing is not performed in a block in which the added signal light is multiplexed to the transmitted WDM signal light. On the other hand, in the transmission penalty Q4, the narrowing is performed in both of the first wavelength multiplexing processing block in which signal light is added to the other signal light and the block in which the added signal light is multiplexed to the transmitted WDM signal light.

A difference between measurement values of the transmission penalties Q3 and Q4 is based on a difference between the above-described configurations. When the transmission penalties Q3 and Q4 are compared with each other, a characteristic of the transmission penalty Q3 is better than that of the transmission penalty Q4.

The reason is that when the narrowing is performed in both of the first wavelength multiplexing processing block in which signal light is added to the other signal light and the block in which the added signal light is multiplexed to the transmitted WDM signal light, not only an overlapped portion of the optical spectra but also the volume of information is deleted through the narrowing of the optical spectra themselves. Note, however, that also in the above-described case, crosstalk is largely reduced and the transmission quality is improved as compared with the conventional optical transmission system 5.

Next, colorless wavelength setting and gridless wavelength setting will be described. When a predetermined transmission control is performed with respect to the transmission control elements 2-1 to 2-n of the WSS 2 of FIG. 1, not only the narrowing setting of the wavelength but also the colorless or gridless wavelength setting is performed.

Figure 12:
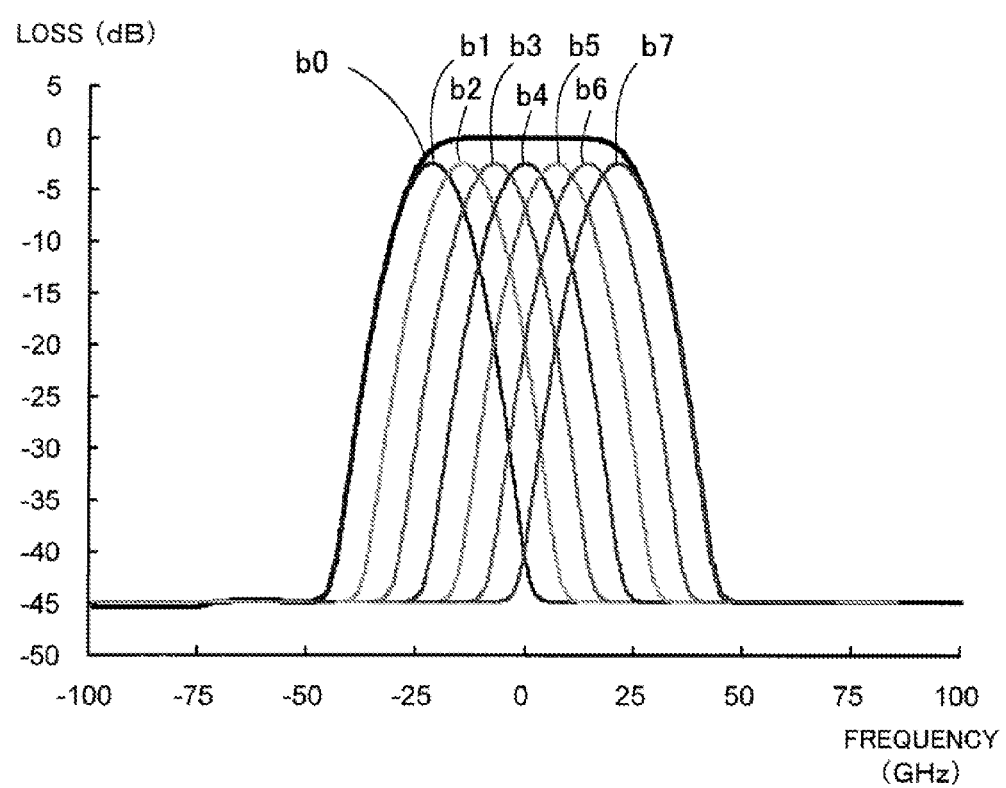
FIG. 12 illustrates colorless wavelength setting.
Figure 13:
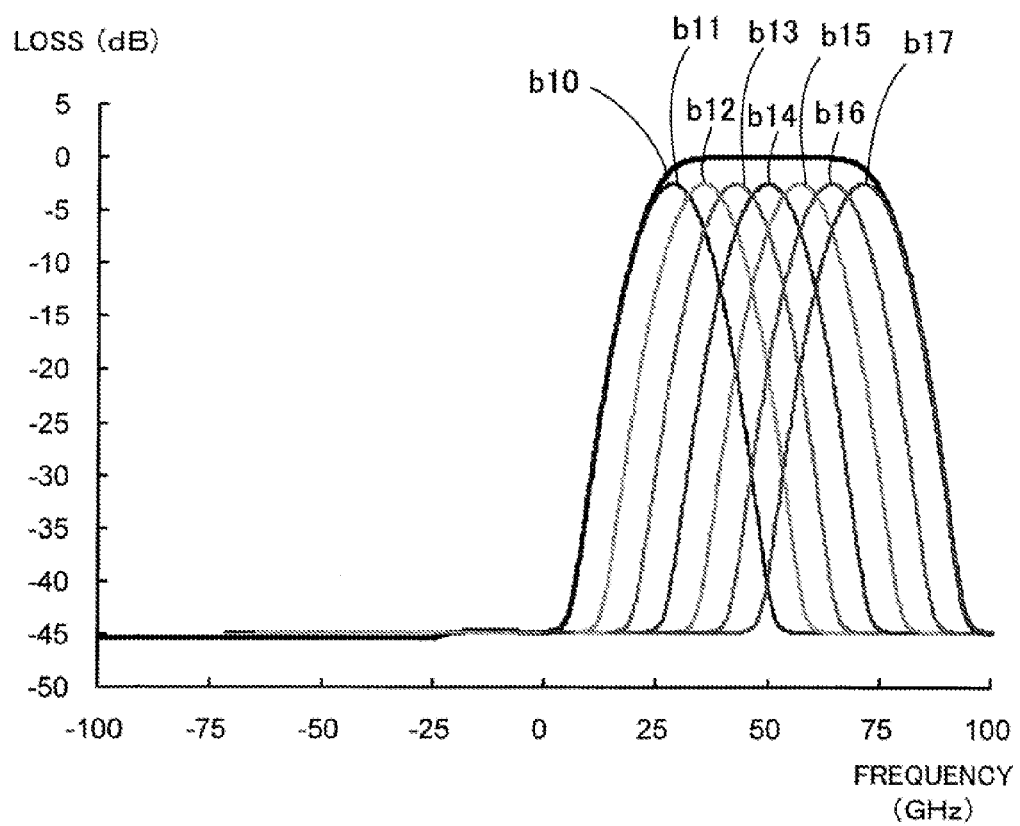
FIG. 13 illustrates colorless wavelength setting.

FIGS. 12 and 13 illustrate the colorless wavelength setting. The horizontal axis represents the frequency (relative frequency: GHz), and the longitudinal axis represents the loss (relative loss: dB).

FIG. 12 illustrates a transmission characteristic of signal light of one wave having the wavelength $\lambda 0$. Suppose that a transmission characteristic b0 has a shape as illustrated in FIG. 12 with respect to a signal light spectrum a center frequency of which is 0 GHz (shape of an outmost line).

In an example of FIG. 12, when a wavelength channel having the wavelength $\lambda 0$ is transmitted according to the transmission characteristic b0, the WSS 2 turns on all of seven transmission control elements and generates transmission bands of the transmission characteristics b1 to b7, thereby realizing the transmission characteristic b0.

FIG. 13 illustrates a transmission characteristic b10 of the signal light having a wavelength $\lambda 1$. FIG. 13 illustrates a state where a transmission band of a signal light spectrum in which a center frequency of the wavelength $\lambda 0$ is 0 GHz is wavelength-shifted to that in which a center frequency of the wavelength $\lambda 1$ is 50 GHz.

Specifically, the WSS 2 turns off all of the seven transmission control elements which generate the transmission characteristic b0, turns on all of seven transmission control elements which generate the transmission characteristic b10, and generates transmission bands of transmission characteristics b11 to b17, thereby realizing the transmission characteristic b10.

As can be seen from the above discussion, when setting a predetermined wavelength band, the WSS 2 turns on a transmission control element as much as one wavelength channel and generates a transmission characteristic of the wavelength band. The above processing permits a wavelength to be transmitted to be changed and colorless wavelength setting to be performed.

Figure 14:
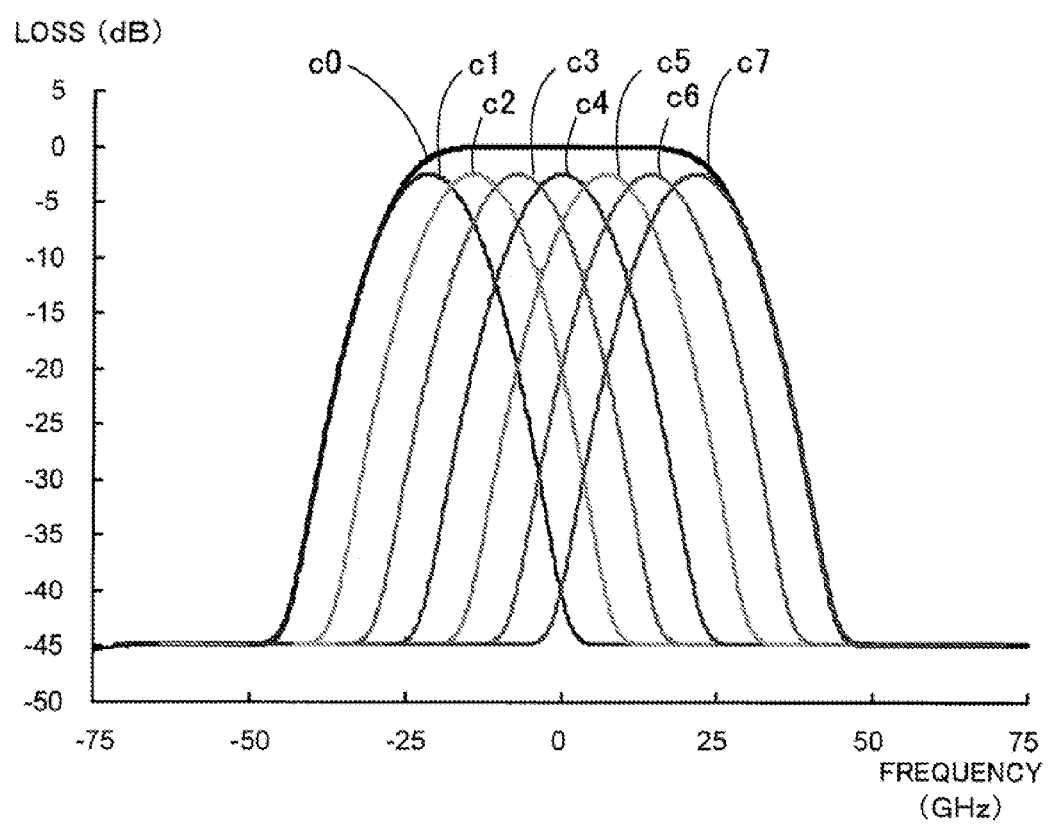
FIG. 14 illustrates gridless wavelength setting.
Figure 15:
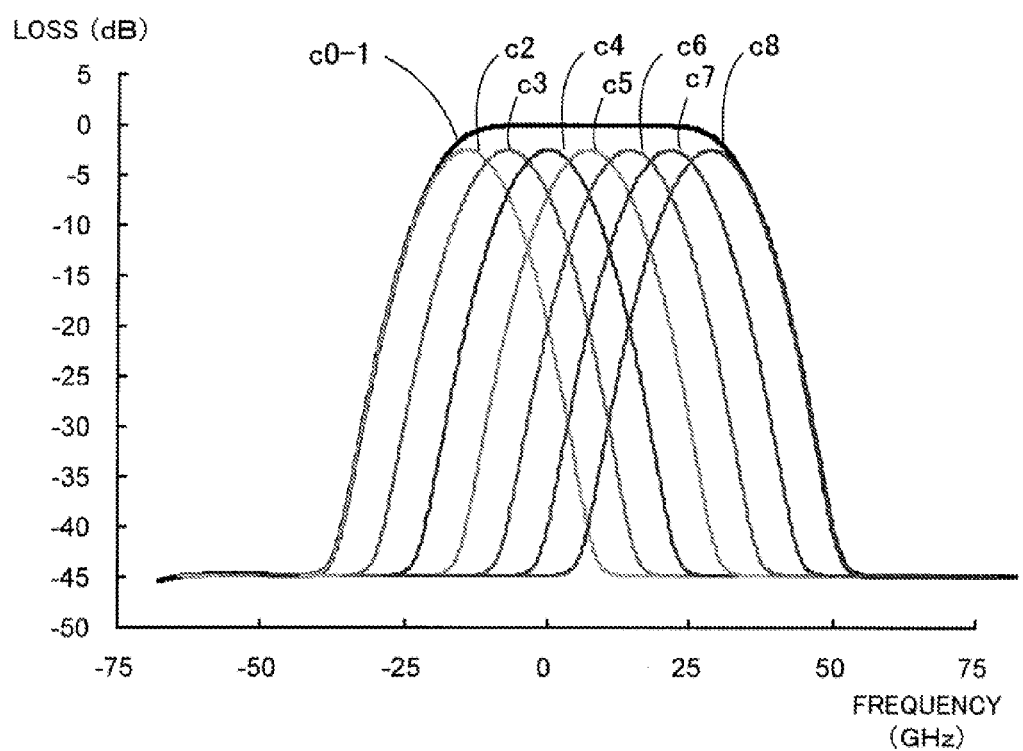
FIG. 15 illustrates gridless wavelength setting.

FIGS. 14 and 15 illustrate gridless wavelength setting. The horizontal axis represents the frequency (relative frequency: GHz), and the longitudinal axis represents the loss (relative loss: dB).

FIG. 14 illustrates a transmission characteristic of the signal light of one wave having the wavelength $\lambda 0$. Suppose that a transmission characteristic c0 has a shape as illustrated in FIG. 14 with respect to a signal light spectrum a center frequency of which is 0 GHz (shape of an outmost line).

In an example of FIG. 14, when a wavelength channel having the wavelength $\lambda 0$ is transmitted according to the transmission characteristic c0, the WSS 2 turns on all of the seven transmission control elements and generates transmission bands of the transmission characteristics c1 to c7, thereby realizing the transmission characteristic c0.

FIG. 15 illustrates a state where a center frequency of the wavelength channel having the wavelength $\lambda 0$ is shifted to the high frequency side as much as one grid. Suppose here that the transmission characteristics c1 to c7 which realize the transmission characteristic c0 of FIG. 14 correspond to control of the transmission control elements 2-1 to 2-7, respectively.

When the transmission characteristic c0 is shifted to the high frequency side as much as one grid (as much as frequency controllable by one transmission control element), the WSS 2 turns off the transmission control element 2-1 and sets the transmission characteristic c1 as a cutoff band. Further, the WSS 2 turns on a new transmission control element 2-8 and generates a transmission band of a transmission characteristic c8. When performing the above-described control, the WSS2 shifts a center frequency to the high frequency side as much as one grid and performs fine adjustment.

As can be seen from the above discussion, the WSS 2 reduces a transmittance of the transmission control element on the low frequency side and raises a transmittance of the transmission control element on the high frequency side, thus shifting a center frequency of the transmission signal to the high frequency side as much as the number of predetermined grids.

On the contrary, the WSS 2 reduces a transmittance of the transmission control element on the high frequency side and raises a transmittance of the transmission control element on the low frequency side, thus shifting a center frequency of the transmission signal to the low frequency side as much as the number of predetermined grids. The above processing permits the gridless wavelength setting to be performed.

As described above, when a predetermined transmission control is performed to the transmission control elements 2-1 to 2-n, the WSS 2 may perform not only wavelength narrowing setting but also colorless or gridless wavelength setting.

Therefore, when the WSS 2 is applied to a configuration in which the wavelength multiplexing is performed, colorless or gridless wavelength setting may be further performed in addition to suppression of crosstalk caused by the wavelength narrowing setting. As a result, these features of the present embodiment permit a flexible system to be constructed and an operating property to be improved.

Figure 16:
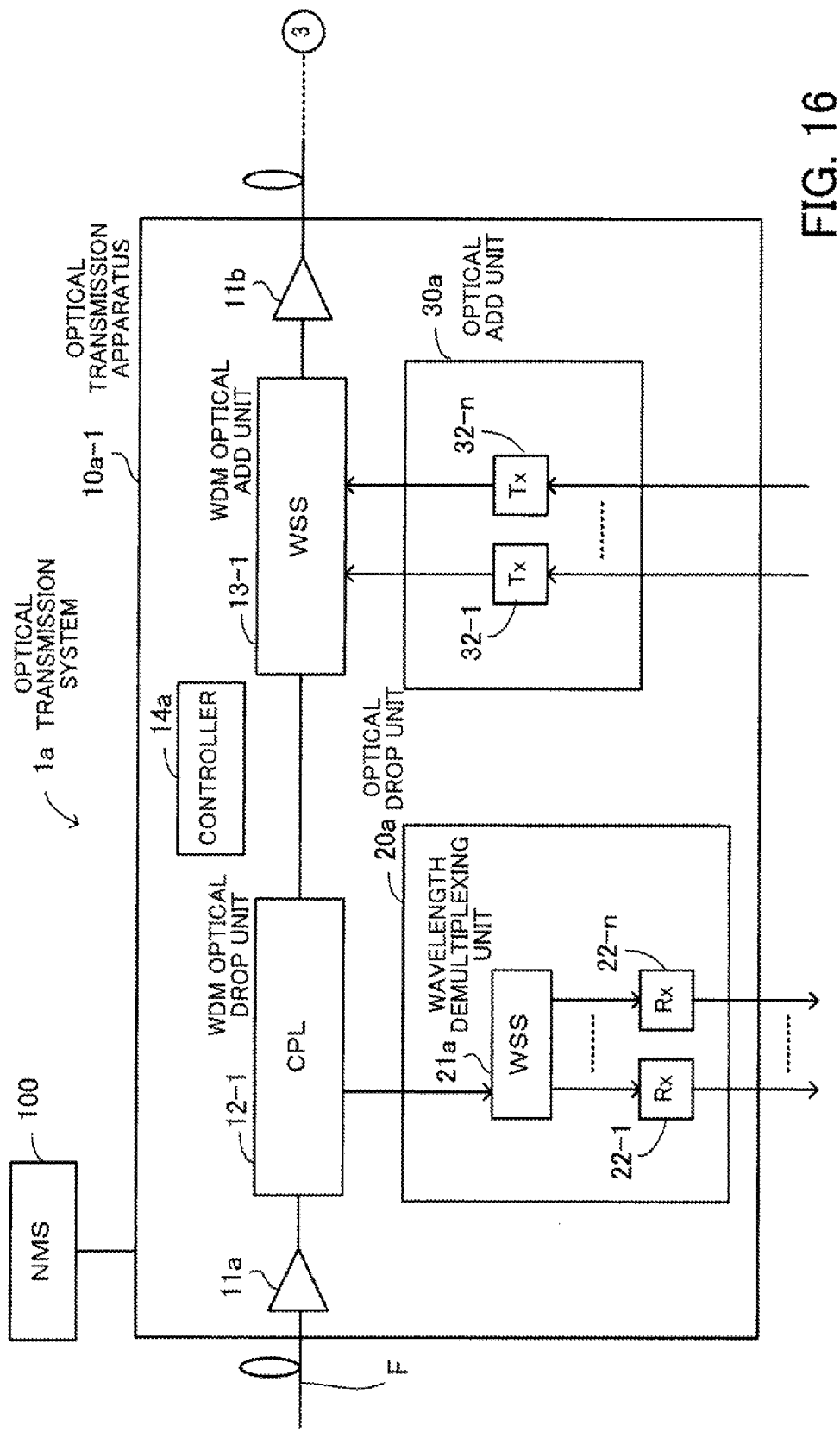
FIG. 16 illustrates a configuration example of an optical transmission system.
Figure 17:
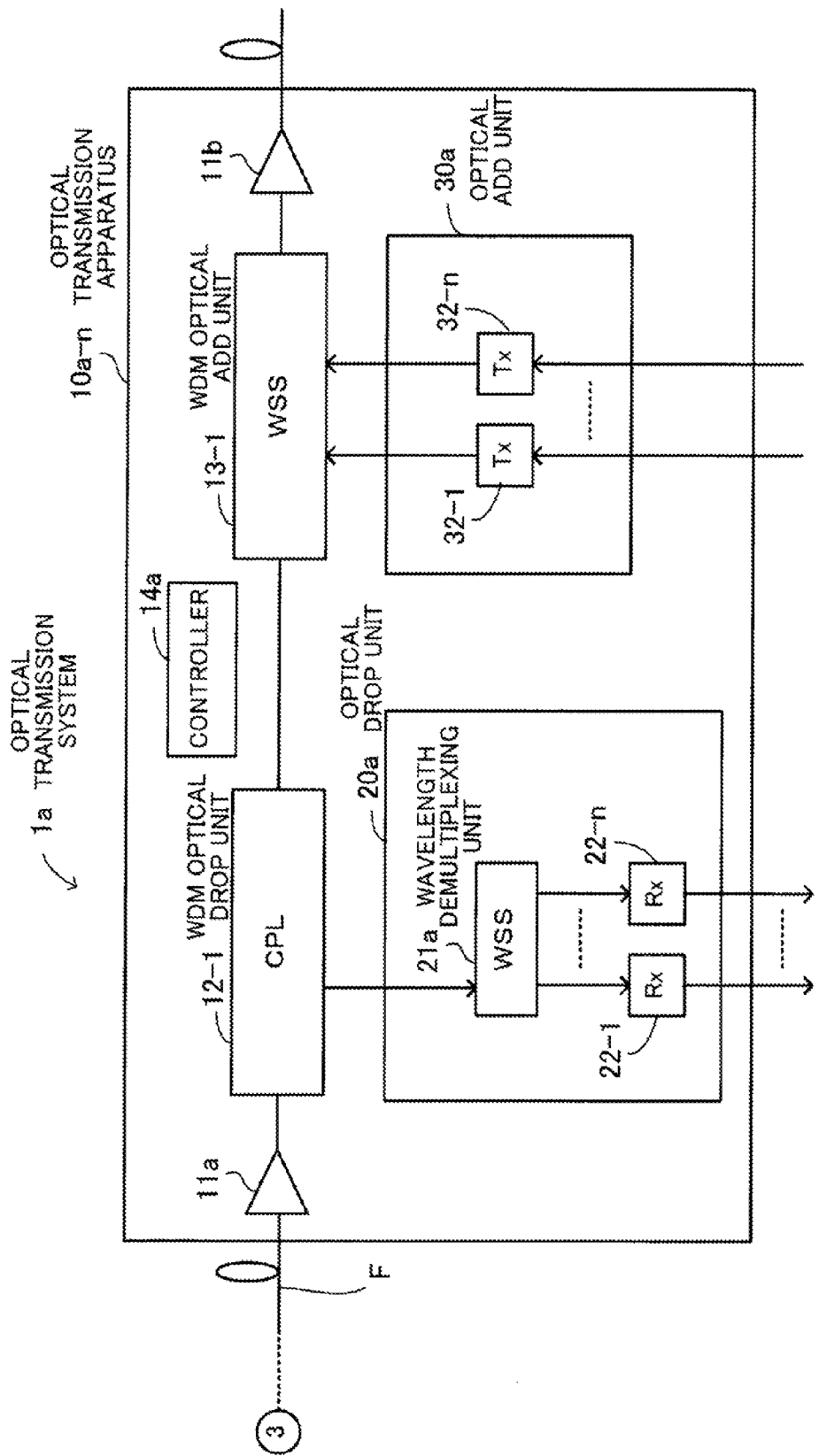
FIG. 17 illustrates a configuration example of an optical transmission system.

Next, a modification of the optical transmission system 1 will be described. FIGS. 16 and 17 illustrate a configuration example of the optical transmission system. The optical transmission system 1a includes optical transmission apparatus 10a-1 to 10a-n, and they are serially connected through the optical fiber transmission path F.

The NMS 100 is further connected to the optical transmission apparatus 10a-1. The NMS 100 has a user interface function, and performs operational management of the entire optical transmission system 1a including the optical transmission apparatus 10a-1 to 10a-n.

The optical transmission system 1 described above in FIGS. 9 and 10 has a configuration adapted to a case where multiple wavelengths are added and dropped, and the optical transmission system 1a according to the modification has a configuration adapted to a case where a small number of wavelengths are added and dropped.

The optical transmission apparatus 10a-1 to 10a-n each include a preamplifier 11a, a post amplifier 11b, a WDM optical drop unit 12-1, a WDM optical add unit 13-1, a controller 14a, an optical drop unit 20a, and an optical add unit 30a.

The WDM optical drop unit 12-1 and the optical drop unit 20a mainly perform processing relating to drop of the wavelength channels, and the WDM optical add unit 13-1 and the optical add unit 30a mainly perform processing relating to addition of the wavelength channels.

The optical drop unit 20a includes a wavelength demultiplexing unit 21a and receiving units 22-1 to 22-n. The optical add unit 30a includes transmitting units 32-1 to 32-n. For an application device, an optical coupler is used as the WDM optical drop unit 12-1, and a WSS is used as the WDM optical add unit 13-1 and the wavelength demultiplexing unit 21a.

The preamplifier 11a amplifies WDM signal light flowing through the optical fiber transmission path F. The WDM optical drop unit 12-1 receives the amplified WDM signal light and drops it into two portions. One dropped WDM signal light is supplied to a main transmission line (to the WDM optical add unit 13-1) and the other dropped WDM signal light is supplied to the optical drop unit 20a.

The wavelength demultiplexing unit 21a of the optical drop unit 20a demultiplexes the WDM signal light dropped and produced from the WDM optical drop unit 12-1 into signal light at every wavelength. The receiving units 22-1 to 22-n receive signal light produced from the wavelength demultiplexing unit 21a at every wavelength and perform reception processing of signal light of each wavelength, thereby outputting it to the client side.

On the other hand, the transmitting units 32-1 to 32-n of the optical add unit 30a perform transmission processing of signal light transmitted from the client side. The WDM optical add unit 13-1 receives signal light added by the optical add unit 30a. The WDM optical add unit 13-1 then wavelength-multiplexes the WDM signal light transmitted from the WDM optical drop unit 12-1 and the signal light added by the optical add unit 30a, and generates new WDM signal light.

The post amplifier 11b amplifies the WDM signal light produced from the WDM optical add unit 13-1 and outputs it to a next stage apparatus through the optical fiber transmission path F.

The controller 14a receives setting from the NMS 100 and performs operation setting and supervisory control of its own apparatus. The controller 14a further notifies the NMS 100 of an operation status. The controller 14a further communicates with the controllers 14a of the other apparatus. In addition, communication between the NMS 100 and the controller 14a, and communication between the controllers 14a of the apparatus are performed, for example, by using an OSC signal.

A function of the WSS 2 which performs the narrowing described above in FIG. 1 of the transmission band is here applied to components in which the wavelength multiplexing of the optical transmission system 1a is performed. Specifically, a function of the WSS 2 is applied to all the WDM optical add units 13-1 of all the optical transmission apparatus 10a-1 to 10a-n, and the transmission bands of the wavelength channels to be added are narrowed.

Alternatively, a function of the WSS 2 may be applied only to the WDM optical add unit 13-1 of a first stage optical transmission apparatus 10a-1 and a transmission band of the wavelength channel to be added may be narrowed. The transmission bands may fail to be narrowed to the WDM optical add units 13-1 of the optical transmission apparatus 10a-2 to 10a-n.

For example, the NMS 100 notifies the controllers 14a of the optical transmission apparatus of the narrowing control setting in the transmission band through the WSS 2. The controllers 14a receiving the notification then perform the narrowing setting to the corresponding WSS 2. The above-described configuration of the optical transmission system 1a permits crosstalk during the wavelength multiplexing to be suppressed and the transmission quality to be improved.

As described above, the WSS 2 has a configuration in which transmittance of the transmission control elements 2-1 to 2-n are controlled, at least one predetermined band on the low and high frequency sides is set as a cutoff band, and the transmission band is narrowed at every input signal light to be wavelength-multiplexed. Accordingly, the present embodiment makes it possible to efficiently delete feet of optical spectra between adjacent wavelength channels, suppress crosstalk, and improve transmission quality.

The optical transmission system implements not only large suppression of signal degradation due to crosstalk but also a colorless or gridless OADM function. Accordingly, the present embodiment may improve flexibility and operating property of the optical transmission system.

As can be seen from the embodiment discussed above, the proposed wavelength selective switch and optical transmission apparatus permit crosstalk to be suppressed and transmission quality to be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions and alterations could be made hereto without departing from the spirit and scope of the invention.

What is claimed is:

1. A wavelength selective switch comprising:
a plurality of transmission control elements configured to divide input signal light into wavelength bands within a channel band and transmit or cut off the divided input signal light; and
a controller configured to control a transmittance of the transmission control element of at least one of low and high frequency sides in the channel band;
wherein at least one of predetermined bands on the low and high frequency sides is set as a cutoff band and a transmission band of the input signal light is narrowed, and a band portion in which optical spectra of the input signal light is overlapped is deleted.

2. An optical transmission apparatus comprising:
a first wavelength selective switch configured to perform wavelength multiplexing of input signal light having a plurality of wavelengths different from each other; and
a second wavelength selective switch configured to wavelength-multiplex and add first signal light produced from the first wavelength selective switch into second signal light,
wherein the first wavelength selective switch includes a plurality of first transmission control elements which divide input signal light into wavelength bands within a channel band and transmit or cut off the divided input signal light, and a controller which controls a transmittance of the first transmission control element of at least one of low and high frequency sides in the channel band;
wherein the first wavelength selective switch sets as a cutoff band at least one of predetermined bands on the low and high frequency sides and narrows a transmission band of the input signal light, and a band portion in which optical spectra of the input signal light is overlapped is deleted.

3. The optical transmission apparatus according to claim 2, wherein:

the second wavelength selective switch has a plurality of second transmission control elements which divide the first and second signal light into wavelength bands within each channel band and transmit or cut off the divided first and second signal light; and the controller controls a transmittance of the second transmission control element of at least one of the low and high frequency sides in the channel band.

4. The optical transmission apparatus according to claim 3, wherein the second wavelength selective switch sets as a cutoff band at least one of predetermined bands on the low and high frequency sides and narrows a transmission band of the input signal light.

5. An optical transmission apparatus comprising:

a plurality of transmitting units configured to output a plurality of signal light having wavelengths different from each other; and a wavelength selective switch configured to wavelength-multiplex and add a plurality of signal light transmitted from the transmitting units into second signal light, wherein the wavelength selective switch includes a plurality of transmission control elements which divide the plurality of signal light into wavelength bands within each channel band and transmit or cut off the divided signal light, and a controller which controls a transmittance of the transmission control element of at least one of low and high frequency sides in each of the channel bands;

wherein the wavelength selective switch sets as a cutoff band at least one of predetermined bands on the low and high frequency sides in each of the channel bands, and narrows transmission bands of the plurality of signal light, and a band portion in which optical spectra of the input signal light is overlapped is deleted.

* * * * *